United States Patent [19]

LaFleur

[11] Patent Number: 5,706,086
[45] Date of Patent: Jan. 6, 1998

[54] SYSTEM FOR MEASURING SURFACE ABERRATIONS OF CONCAVE CYLINDRICAL SURFACES

[75] Inventor: L. David LaFleur, Danbury, Conn.

[73] Assignee: Hughes Aircraft Company, Los Angelse, Calif.

[21] Appl. No.: 608,103

[22] Filed: Feb. 28, 1996

[51] Int. Cl.$^6$ .................................... G01B 9/02
[52] U.S. Cl. ............................. 356/359; 356/360
[58] Field of Search ......................... 356/345, 359, 356/360

[56] References Cited

U.S. PATENT DOCUMENTS

| | | | |
|---|---|---|---|
| 4,869,593 | 9/1989 | Biegen | 356/359 |
| 5,416,586 | 5/1995 | Tronolone et al. | 356/359 |

*Primary Examiner*—Frank G. Font
*Assistant Examiner*—Robert Kun
*Attorney, Agent, or Firm*—W. C. Schubert, W. K. Denson-Low

[57] ABSTRACT

An improved system (30) for measuring surface aberrations of concave cylindrical surfaces. In the illustrative embodiment, the invention includes a transmission flat (20), an interferometer (32), and a surface to be measured (28). The transmission flat (20) is a transparent disc that is placed between the interferometer (32) and the surface (28) to be measured. An electromagnetic wave (33,34,36,37) is generated by the interferometer (32), and is directed through the transmission flat (20). The wave (41) bounces off the surface (28) to be measured and is retro-reflected off a first surface (26) of the transmission flat. The electromagnetic wave (42) returns to the opposite side of the surface (28) under test. The wave (43) then bounces off the surface (28) under test and passes through the transmission flat (20). The wave (43) interferes with light (39) that is reflected from a reference surface (26) of transmission flat (20) on a first bounce. Information contained in the interference pattern is used by the interferometer (32) to construct an image representative of the surface (28) to be measured. In a specific embodiment, a non-transparent strip of material (22) is disposed across the center of the transmission flat (20). The strip (22) prevents skewed light reflected off the measured surface from entering the interferometer (32) on the first bounce from the surface (28) under test, and blurring the image of the surface (28). In the illustrative embodiment, the transmission flat (20) has a reference surface (26) that reflects a portion of the electromagnetic wave (38,39) back toward the interferometer (32). The reflected wave (38,39) provides a reference for interferometer (32) calculations.

15 Claims, 1 Drawing Sheet

SYSTEM FOR MEASURING SURFACE ABERRATIONS OF CONCAVE CYLINDRICAL SURFACES

BACKGROUND OF THE INVENTION

1. Field of Invention

This invention relates to systems for measuring surface aberrations. Specifically, the present invention relates to systems for measuring surface aberrations of concave cylindrical mirrors and lenses in high performance optical systems and the like.

2. Description of the Related Art

Mirrors, lenses, and other optical components are used in a variety of demanding applications ranging from space telescopes to laser systems. For example, parabolic and cylindrical mirrors are used in excimer laser systems and laser diode collimators. Such systems require optical components with minimal surface aberrations. Aberrations on the surfaces of the optical components scatter light, reducing the ability of optical components to focus light and achieve their desired functions.

Surface aberrations, or roughness, of optical components must generally be measured before the components are used in applications such as laser diode collimators. To measure the surface aberrations of optical components such as cylindrical mirrors, cylindrical test objectives were developed. The test objectives are used to form cylindrical wavefronts that match the surface of the components being tested. To accurately measure a given component's surface, the test objective had to be free of aberrations itself. As a result, test objectives are difficult and expensive to manufacture and calibrate.

Subsequently, interferometers were used with transmission spheres to measure the surface aberrations of concave cylindrical lenses and mirrors. Transmission spheres are spherical lenses that are placed between the surface to be measured and the interferometer. An electromagnetic wave generated by the interferometer passes through the transmission sphere, bounces off the surface to be measured, and returns through the transmission sphere generating an interference pattern representative of a one dimensional cross-section of the measured surface. To observe the two dimensional characteristics of the measured surface, several radial measurements are combined with several axial measurements and then matched. However, this method is susceptible to matching errors. In addition, the method is time consuming and expensive.

In an effort to find a less expensive, more accurate system for measuring the surface aberrations of optical components, interferometers were tested with transmission flats. Transmission flats are disc-shaped transparent windows used to create interference patterns representative of the measured surface. When measuring cylindrical mirrors such as those used in the excimer laser system, light is reflected off the inside walls of the cylindrical mirror and retro-reflected by the transmission flat. Unfortunately, unwanted light transmitted at the transmission flat on the first bounce from the surface to be measured is detected by the interferometer camera and prohibits the interferometer from making accurate measurements.

Hence, a need exists in the art for an improved system for measuring the surface aberrations of mirrors and lenses, including concave cylindrical mirrors.

SUMMARY OF THE INVENTION

The need in the art is addressed by the measuring system of the present invention. In the illustrative embodiment, the invention includes a transmission flat, an interferometer, and a surface to be measured. The transmission flat is a transparent disc that is placed between the interferometer and the surface to be measured. An electromagnetic wave is generated by the interferometer, and is directed through the transmission flat. The wave bounces off the surface to be measured and returns through the transmission flat to the interferometer generating an interference pattern. Information contained in the interference pattern is used by the interferometer to construct an image representative of the surface to be measured.

In a specific embodiment, a non-transparent strip of material is deposited across the center of the transmission flat. The strip prevents first bounce refracted light from the measured surface from entering the interferometer and blurring the image of the surface.

In the illustrative embodiment, the transmission flat has a reference surface that reflects a portion of the electromagnetic wave back toward the interferometer. The reflected wave provides a reference for an imaged interferogram.

DESCRIPTION OF THE INVENTION

Figure 1:
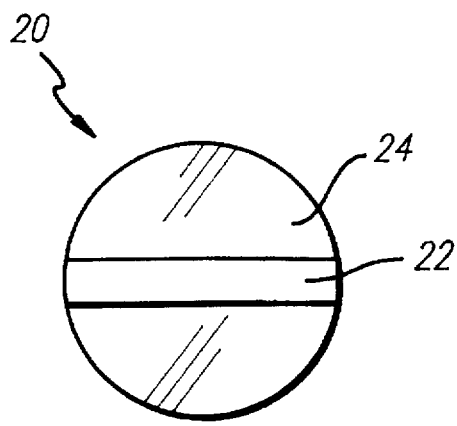
FIG. 1 is a back view of a transmission flat constructed in accordance with the teachings of the present invention.

The invention is described below in reference to the accompanying drawings in which like reference numerals denote like parts. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a back view of the transmission flat of the present invention. The transmission flat 20 is shown with an opaque strip 22 disposed across the center of the back surface 24 of the transmission flat 20. The transmission flat 20 is a transparent disc constructed of glass, crystal, or other clear material. In a specific embodiment, a black paint with a low reflectance and a high emissivity constant is used for the strip 22. An example of such a paint is Chemglaze Z306. Those skilled in the art will appreciate that other opaque materials may be used for this purpose without departing from the scope of the present invention.

Figure 2:
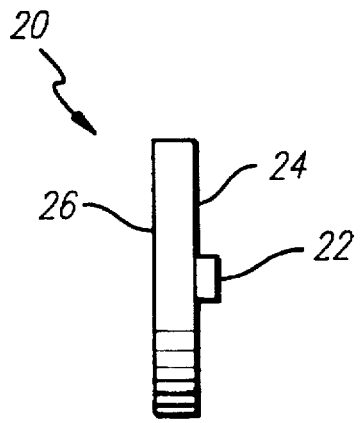
FIG. 2 is a side view of the transmission flat of FIG. 1

FIG. 2 is a side view of the transmission flat of FIG. 1. The strip 22 is shown disposed across the back surface 22 of the transmission flat 20. A front surface 26, opposite the back surface 24 is specially polished to achieve a very flat surface. The front surface 26 acts as a reference surface for interferometer calculations. The thickness of the strip 22 is typically in the millimeter to centimeter range. The strip 22 has a non-reflective surface 23 that has a refractive index equal to the refractive index of the transmission flat 20. The interferometer (not shown) may be adjusted to compensate for different thickness of the transmission flat 20. The diameter of the transmission flat 20 varies according to the size of the surface to be measured (not shown), the size of the interferometer (not shown) and the location of the transmission flat 20 with respect to the interferometer (not shown). Typically, the diameter of the transmission flat 20 is either the same size as the surface to be measured (not shown) or is the diameter of the interferometer beam (shown in FIG. 3 as 33) which typically ranges from four to twelve inches.

Figure 3:
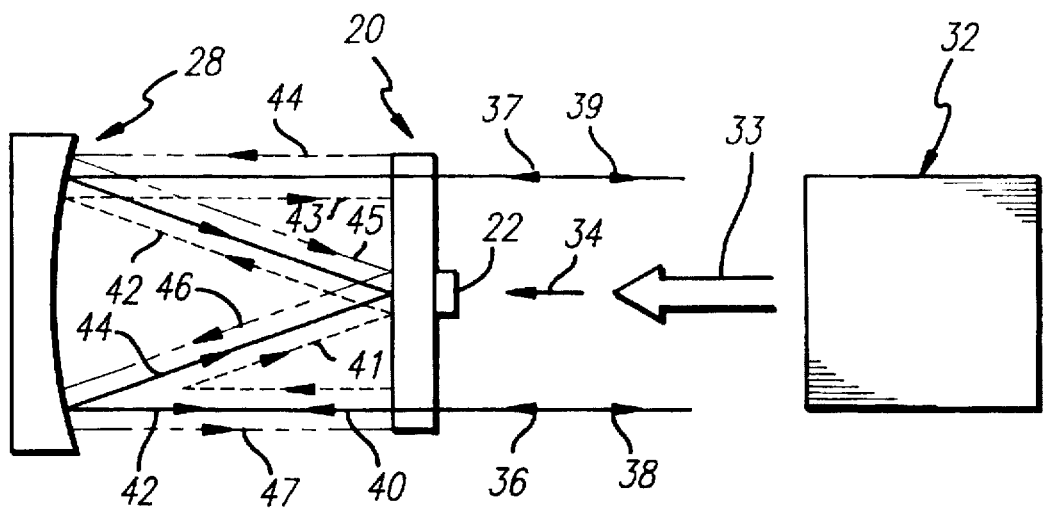
FIG. 3 is a side view of a measurement system utilizing the transmission flat of the present invention.

FIG. 3 is a side view of a measurement system utilizing the transmission flat of the present invention. The system 30 includes a surface to be measured 28, the transmission flat 20, and an interferometer 32. The transmission flat 20 is placed between the interferometer 32, and the object to be measured 28. In the present illustrative embodiment, the object to be measured 28 is a cylindrical mirror. The interferometer 32 is a conventional interferometer such as a Zygo.

In operation, a collimated wavefront 33 such as laser light from the interferometer impinges on the back surface 24 of the interferometer at a 90 degree angle. Light 34 impinging on the strip 22 is absorbed by the strip 22. Light 36 not impinging on the strip 22 passes through the strip 22 to the surface 26. A glass to air interface exists at the front surface 26 where a first portion of light 38 from the interferometer 32 is reflected back to the interferometer 32. The reflected light 38 is used by the interferometer 32 as a reference for an imaged interferogram. A second portion of light 40 passes through the surface 26 interface and onto the surface to be measured 28. The light 40 is reflected off the surface 28 toward the center of the transmission flat. A portion of light 41 is reflected off the surface 28 at an angle. In the prior art, the light 41 returns to the interferometer 32 through the transmission flat 20, blurring the image or the surface 28 in the interferometer. In the present invention, the light 41 is blocked or absorbed by the strip 22, facilitating accurate two-dimensional measurements of optical components. In the present specific embodiment, the non-reflective surface 23 of the strip 22 facing the surface 28 has the same refractive index as the glass used to manufacture the transmission flat 20.

For illustrative purposes, the collimated wavefront 33 is shown providing light that travels along a first light path and light that travels along a second light path. The first light path includes the interferometer light 36, transmitted light 40, reflected light 41, reflected light 42, and returning light 43. The second path includes interferometer light 37, transmitted light 44, reflected light 45, reflected light 46, and returning light 47. The returning light 47 from the second path combines with the light 38 forming an interference pattern in the interferometer 32 representative of the surface characteristics of the surface 28 to be measured.

Light 37 from the interferometer 32 impinges on the transmission flat 20. A portion of the light 37 is reflected off the transmission flat 20 as light 39. Light 39 combines with light 43 from the first light path to form an interference pattern in the interferometer 32. A portion of the light 41 is reflected off the surface 26 of the transmission flat 20 as the reflected light 42. The reflected light 42 returns to the opposite side of the surface 28 under test. The light 42 then bounces off the surface 28 as the returning light 43 and passes through the transmission flat 20. The returning light 43 interferes with the light 39 that is reflected from the reference surface 26 of transmission flat 20 forming an interference pattern in the interferometer 32 representative of the surface 28 to be measured.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for measuring surface aberrations comprising:
   first means for generating a first wave of electromagnetic energy;
   second means for extracting, from said first wave, second wave and third waves of electromagnetic energy, said second wave being a reference wave;
   third means disposed on said second means for selectively blocking electromagnetic energy in said third wave;
   fourth means for combining said reference wave and said selectively blocked third wave to provide an interference pattern; and
   interferometer means for analyzing said interference pattern to identify aberrations in said surface.

2. The invention of claim 1 wherein said first wave of electromagnetic energy is a collimated electromagnetic wavefront.

3. The invention of claim 2 wherein said first wave of electromagnetic energy is generated by an interferometer.

4. The invention of claim 2 wherein said first means includes an interferometer for generating said first wave.

5. The invention of claim 1 wherein said second means includes a transmission flat having a first and second surface.

6. The invention of claim 5 wherein said transmission flat is a transparent glass disc.

7. The invention of claim 5 wherein said third means is disposed on said second surface of said transmission flat.

8. The invention of claim 7 wherein second means includes said first surface of said strip with a surface to air interface for providing said second wave for interferometer calculations.

9. The invention of claim 7 wherein said third means is a strip of non-transparent material for selectively blocking electromagnetic energy in said third wave that is not perpendicular to the transmission flat.

10. The invention of claim 9 wherein said third means includes a surface facing said surface to be measured and having a refractive index equal to the refractive index of said transmission flat.

11. The invention of claim 1 wherein said fourth means is an interferometer.

12. The invention of claim 1 wherein said fourth means is a transmission flat.

13. The invention of claim 1 wherein said interferometer means is an interferometer.

14. An improved system for measuring surface aberrations of a surface comprising:
   a transparent disc shaped transmission flat including a first surface to air interface for generating a reference wave for interferometer calculations;
   an interferometer placed to one side of the transmission flat for directing a collimated electromagnetic wave beam through the transmission flat and reflecting a first portion of the beam off a surface to be measured and retro-reflecting a second portion of said beam off a reference surface of said transmission flat so that said first portion and said second portion of said beam interfere, creating an interference pattern representative of the surface to be measured; and
   a strip of non-transparent material deposited across the center of said transmission flat for blocking a second portion of said electromagnetic wave beam from entering said interferometer and subsequently distorting said interference pattern.

15. A technique for measuring the surface aberrations of cylindrical surfaces comprising the steps of:

painting a strip of opaque material across the center of a transmission flat;

directing a collimated electromagnetic wave beam through said transmission flat;

generating an interference pattern by reflecting a first portion of said wave beam off a surface to be measured and retro-reflecting a second portion of said wave beam off a reference surface of said transmission flat so that said first portion and said second portion of said wave interfere creating said interference pattern; and constructing an image representative of said surface to be measured from said interference pattern using an interferometer.

* * * * *